(12) United States Patent
Kameyama

(10) Patent No.: US 6,252,742 B1
(45) Date of Patent: Jun. 26, 2001

(54) DISK DRIVE AND FLOATING HEAD SLIDER WITH MEANS FOR MINIMIZING DUST ACCUMULATION THEREON

(75) Inventor: Masaki Kameyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/098,161

(22) Filed: Jun. 16, 1998

(30) Foreign Application Priority Data

Jul. 2, 1997 (JP) .................................................. 9-177239

(51) Int. Cl.⁷ .............................. G11B 17/32; G11B 5/41
(52) U.S. Cl. ......................................... 360/237; 360/97.02
(58) Field of Search .................................. 360/103, 128, 360/135, 97.02, 237

(56) References Cited

U.S. PATENT DOCUMENTS

| | | | |
|---|---|---|---|
| 4,586,100 | * 4/1986 | Howe et al. | 360/128 |
| 5,093,173 | * 3/1992 | Nakagawa et al. | 360/135 |
| 5,267,104 | * 11/1993 | Albrecht et al. | 360/103 |
| 5,285,337 | * 2/1994 | Best et al. | 360/103 |
| 5,424,884 | * 6/1995 | Nonaka | 360/128 |
| 5,798,164 | * 8/1998 | Weiss et al. | 360/135 |
| 5,841,608 | * 11/1998 | Kasamatsu et al. | 360/103 |
| 5,886,856 | * 3/1999 | Tokuyama et al. | |
| 6,040,958 | * 3/2000 | Yamamoto et al. | |

FOREIGN PATENT DOCUMENTS

| | | |
|---|---|---|
| 61-026920 | * 2/1986 | (JP) . |
| 61-120322 | * 6/1986 | (JP) . |
| 61-227217 | * 10/1986 | (JP) . |
| 62-114115 | 5/1987 | (JP) . |
| 63-037874 | 2/1988 | (JP) . |
| 63-052316 | * 3/1988 | (JP) . |
| 63-090018 | * 4/1988 | (JP) . |
| 2-050312 | * 2/1990 | (JP) . |
| 2-146104 | * 6/1990 | (JP) . |
| 3-120616 | * 5/1991 | (JP) . |
| 4-307410 | 10/1992 | (JP) . |
| 4-310609 | * 11/1992 | (JP) . |
| 4-337510 | * 11/1992 | (JP) . |
| 5-314434 | 11/1993 | (JP) . |
| 7-153038 | * 6/1995 | (JP) . |
| 7-211037 | 8/1995 | (JP) . |
| 8-087847 | 4/1996 | (JP) . |

* cited by examiner

Primary Examiner—Craig A. Renner
(74) Attorney, Agent, or Firm—Greer, Burns & Crain, Ltd.

(57) ABSTRACT

A head slider of a disk drive has at least one or more slider rails on a base plate which extend lengthwise over the base plate and have surfaces for generating a hovering/floating force. Two or more pads are fitted to the surface of the base plate and protrude higher than the rail surfaces, but they are not on the rail surfaces, so dust which accumulates on the pads does not adversely affect the floating characteristics of the rails. In addition, the disk drive combines a cleaning zone on the disk surface with the above-mentioned pad arrangement on the head slider.

6 Claims, 11 Drawing Sheets

DISK DRIVE AND FLOATING HEAD SLIDER WITH MEANS FOR MINIMIZING DUST ACCUMULATION THEREON

BACKGROUND OF THE INVENTION

1. Field of the Invention

This invention relates to a head slider which moves over a storage medium in an external storage device such as a magnetic disk drive or an optical disk drive. More particularly, this invention relates to a floating head slider having air bearing surfaces which are separated from the disk surface when the head is stationary, yet do not accumulate excessive dust, and can be cleaned in areas of the disk surface provided for cleaning purposes.

2. Description of the Related Art

In disk drives, a CSS (Contact Start and Stop) system is generally adopted for head sliders which float over a storage medium such as a disk in such disk drives. In the CSS system, the head slider is positioned at a CSS zone on part of the surface of the disk medium when the disk drive is stationary. When the disk medium rotates, the head slider floats (or flies) over the surface of the disk medium of the disk drive.

A head slider is generally equipped with reading and/or writing heads. Recent magneto-optical disk drives are also equipped with a magnetic head for application of magnetic fields on the disk in reading and/or writing. Furthermore, on a test basis, an optical head including an optical element such as an object lens or a light emitting element has been installed on a head slider in order to allow a source of light to impinge onto a disk medium.

Such a slider is supported by a suspension, and is moved over the surface of a disk medium by maneuvering the suspension radially across the disk. The head slider floats due to the effect of the air flow over the surface of the rotating disk medium, or a principle of an air bearing force created by the dynamic pressure mechanism on the surface of disk medium.

In recent disk drives, there has been a trend toward lowering the floating height of the floating head slider to accommodate the faster pace with which advances are being achieved in high storage densities, as well as miniaturization. However, lowering the floating height may lead to other problems. For example, reducing the floating height of the slider may increase the risk that the slider will come into contact with projections on the disk surface, causing damage to the contacting surfaces. Consequently, efforts have been made to reduce the roughness of the disk surface to prevent the disk from coming into contact with the head when the floating height of the slider is lowered. However, the less disk surface roughness there is, the greater the contact area of the CSS zone and the more easily the slider will stick to the disk through adsorption. If the adsorption force is large enough, the disk driving motor will bear a heavier load and the suspension supporting the head may be damaged.

To reduce the adsorption force, some ideas have been disclosed, e.g., Japanese Laid open patents Tokkai-sho 63-37874 and Tokkai-hei 8-212740, in which a pad (also referred to as a projection) is attached to the air bearing surface (also referred to as a floating surface or rail surface) of a head slider facing a disk surface, to reduce the contact areas between the slider and the disk medium.

FIGS. 1(a) and 1(b) show head sliders based on the previous technology, depicting the surface which faces the disk medium (floating surface) and the air inflow end, respectively. Slider rails 92 and 93, and pads 94a, 94b, 94c and 94d attached to rail surfaces 92b and 93b are installed onto the surface facing the disk on head slider 90.

FIGS. 1(c) and 1(d) depict the surface of the side and the surface facing the disk (floating surface), and present some problems with the prior technology. Since the pads 94a, 94b, 94c and 94d project from the rail surfaces, which are the air bearing surfaces, airborne dust G inside the disk system tends to accumulate in the peripheries of pads 94a, 94b, 94c and 94d, conveyed by the air flow R created by rotation of the medium. As the amount of accumulated dust increases, fluctuations in the floating condition may eventually develop, resulting in system problems such as faulty recording/playing responses and head failures. Thus, there is a need for such head sliders which do not accumulate dust in this manner. There is also a need for disk arrangements by which the rail surfaces can be cleaned in service.

OBJECTS OF THE INVENTION

Accordingly, one object of this invention is to provide new and improved head sliders for magnetic storage devices.

Another object is to provide new and improved head sliders which float over a rotating disk medium by way of air flow beneath rail surfaces on the bottom of the slider, which air flow does not suffer from excessive dust accumulation on the rail surfaces.

Still another object is to provide methods and apparatus for cleaning the air bearing surfaces of floating head sliders.

SUMMARY OF THE INVENTION

With this background in mind, the present invention is directed at the provision of an improved head slider, as well as a mechanism capable of enhancing the reliability and durability of a disk system through optimization of the surface configuration of the slider. Two or more slider rails are provided with air bearing rail surfaces projecting downwards from a base plate, and extending lengthwise on the base plate to generate a hovering force when the underlying disk rotates at sufficient speed. Two or more pads are attached to the base plate which project below the rail surfaces. In this manner, the pads do not interrupt the air flow over the air bearing rail surfaces, and let the dust pass through the air outlet ends of the rail surfaces, thereby minimizing the amount of dust that collects on the rail surfaces.

In one embodiment, the slider rails are installed on at least both sides of the base plate, and at least one of the pads is attached to either side of the base plate inside or outside of both slider rails. Consequently, it is possible to reduce dust accumulation on the rail surfaces. In addition, if two or more pads are attached to the areas outside the slider rails, the slider can be supported more steadily during CSS operations. This ensures that no base plate portion other than the pads comes into contact with the disk. Therefore, it is possible to reduce dust accumulation on the rail surfaces.

Also, if preferred, a pad forming space can be prepared using the area inside the slider rails. As a result, a considerable number of pads can be formed to assure stable CSS operations. In addition, a variety of pad shapes can be arranged.

At least some of the pads can be made of diamond-like carbon, which is very hard. Thus, the pad hardness can be enhanced, resulting in reduced wear of the pads and prolonged durability. This will prolong the service life of the disk system.

The pads typically project about 10 nm below the rail surfaces. With this mechanism, the pad-disk adsorption prevention function can be maintained over an extended period, even if the pads have been considerably defaced. This will also prolong the service life of the disk system.

Thus, the basic configuration of the invention includes several slider rails with rail surfaces projecting from a base plate and extending lengthwise on the base plate to generate a hovering force, with pads attached to the base plate projecting more than than the rail surfaces. In addition, this invention also features the use of a disk having at least a cleaning zone with a greater degree of roughness compared to the projecting amount formed by the pads attached to the head slider. The cleaning zone can scrape off the deposits formed on the rail surfaces by polishing the rail surfaces on the cleaning zone, so that the floating stability is maintained over an extended period, preventing a failure from occurring.

The cleaning zone can typically be installed inside and/or outside of the CSS zone of the disk. Therefore, either the inner or outer empty space of the CSS zone can be used for cleaning. Cleaning of the rail surfaces can be performed by the movement of the slider toward the inner or outer side of the disk.

By placing the pads outside the slider rails on either side of the base plate, it is possible to curb the accumulation of dust on the rail surfaces. If two or more pads are arranged on the areas outside the slider rails on either side, the slider can be supported steadily during CSS operations. This ensures that no base plate portion other than the pads comes into contact with the disk. In other words, the adsorption problem can be prevented.

If the slider rails are installed on both sides of the base plate and one or more pads are attached to the area between the slider rails on the base plate, it is also possible to curb the accumulation of dust on the rail surfaces. Also, the radial width of the cleaning zone is narrower than the distance between the pads attached to both sides.

As mentioned previously, the cleaning zone can scrape off the deposits formed on the rail surfaces by polishing the rail surface on the cleaning zone between the pads so that stable floating is maintained over an extended period, thus preventing failures. This prolongs the service life of the disk system.

Another characteristic of the present invention is that it has a head movement control device section to regulate the motion of the head slider when accessing the cleaning zone. Also, there is a disk rotation control device section for reducing the disk speed when the head slider is over the cleaning zone.

This control configuration facilitates securely scraping off deposits formed on the rail surfaces because by tracing and polishing the rail surfaces in the cleaning zone, so that stable floating is maintained over an extended period, thus preventing a failure. This also prolongs the service life of the disk system.

Accordingly, it should be evident that by implementing the configurations mentioned above, stable slider floating is maintained for a long time and therefore, the durability and reliability of a disk system are considerably improved.

The above and other objects, features, and advantages of the present invention will become more apparent from the following detailed description.

DETAILED DESCRIPTION OF THE PREFERRED EMBODIMENTS

Figure 2A:
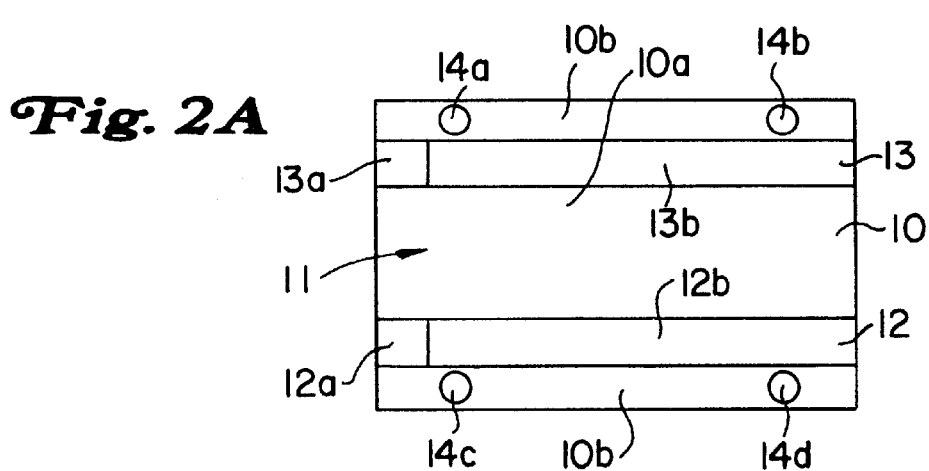
FIG. 2(a) is a bottom view showing the surface of a head slider facing a disk (floating surface) based on a first embodiment of the head slider of the present invention.
Figure 2B:
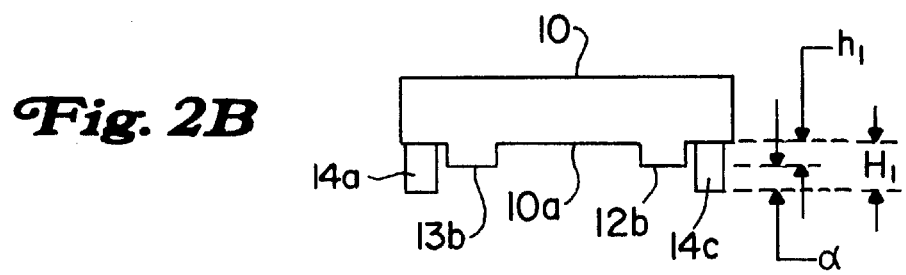
FIG. 2(b) is a front view showing the air inflow end of a head slider based on the first embodiment of the head slider of the present invention.

FIGS. 2(a) to 2(d) show head sliders based on the first embodiment of the invention. FIG. 2(a) shows the surface facing the disk (floating surface) and FIG. 2(b) shows the air inflow end. Two slider rails (also known as side rails) 12 and 13 projecting from between areas 10a and 10b of a base plate 11 of a slider 10, extending lengthwise on the base plate, are provided for both sides of the slider (in the direction parallel to the air flow). Slanting surfaces 12a and 13a introduce an air flow, then the hovering effect (or lift) is generated by rail surfaces 12b and 13b by fitting them on slider rails 12 and 13.

Pads 14a, 14b, 14c, and 14d are attached on areas 10b of the base outside the rail surfaces 12b and 13b. These pads avoid rail surfaces 12b and 13b formed on rails 12 and 13, so they do not interfere with the hovering effect.

The pads 14a, 14b, 14c and 14d jut out from the base plate. The distances between the pads attached to both ends may be long enough to ensure stable balancing when performing starting, stopping and parking functions in the contact start and stop (CSS) regions of a recording disk. In the same manner, by arranging the pads close to the slider rails, the possibility of the rail surfaces coming into contact with the disk during CSS operation can be reduced. Thus, the pad-disk adsorption prevention function can work more efficiently.

The air intake ends of the pads should preferably be formed in a streamline shape, to reduce air resistance and disk friction during CSS operations. In this embodiment, for the sake of convenience, all pads are shown cylindrically. However, it is possible to further lighten the air resistance and the disk friction during CSS operations by using pads having sharp elliptical cross-sections, or ones having longitudinally slender streamlined cross-sections.

The pad height H1 (height from plate surfaces 10a and 10b) is greater than the height of the slider rails h1 (height from plate surfaces 10a and 10b). In this embodiment, the construction is explained using the examples of a head slider which measures about 1.0 mm W, about 1.2 mm L, and about 0.3 mm H. The slider rail height h1 is about 3 μm and the pad height is about 3 μm+α (jutting amount). In this embodiment, the pad height jutting amount is set to about 50 nm. If the jutting amount is set to 0 nm, a pad does not function as a pad-disk adsorption prevention device since the rail surfaces come directly into contact with the surface of the disk during CSS operation. Therefore, α must be greater than 0 nm. Any height sufficient to prevent adsorption can be used, but the pads should preferably just more than 10 nm when considering durability under practical use conditions. This is because the pads come into contact with the disk during CSS operation and will be gradually defaced.

If a disk system is used over an extended period, or if it is driven very frequently, the pad jutting amount should preferably be 30 to 60 nm. However, it goes without saying that the pad height H1 or the jutting amount α need not be confined to these limits but can be determined in accordance with the dimensions of the head slider and its electromagnetic conversion characteristics.

Furthermore, as the width of a rail surface is about 100 to 200 μm and the width of base plate surface 10b is 40 to 50 μm, the external shape should be determined in conformance with these values as well as the pad transversal geometry.

With regard to the slider 10, the rail surfaces 12b and 13b are formed on both sides of the slider rails 12 and 13, and a basin area 10a is cleared between the rail surfaces 12b and 13b. Although roughly sketched in the figures presented, the air outlet (rear end) of the slider 10 is maintained at a level that is lower than the air inlet (front end) in the actual embodiment. This is because slanting surfaces 12a and 13a meet the air pressure with fixed attack angles when the slider 10 is afloat. The head slider 10 has a main surface including a basin area 10a. The slider rails 12 and 13 are provided on the main surface of the head slider 10 as protruding from a main surface of the head slider 10. The head slider itself is regarded as a slider body.

In this embodiment, four pads are formed on both ends; that is, two near the air inlet end and another two near the air outlet end. In other words, pads in all four corners are ideal for supporting the slider during CSS operations. Thus, it is possible to prevent any portions of the slider other than the pads from coming into contact with and sticking to disk 20. The four pads are provided on the main surface of the slider body, not on the surface of the slider rails 12 and 13. The four pads protrude from the main surface of the slider body.

Figure 2C:
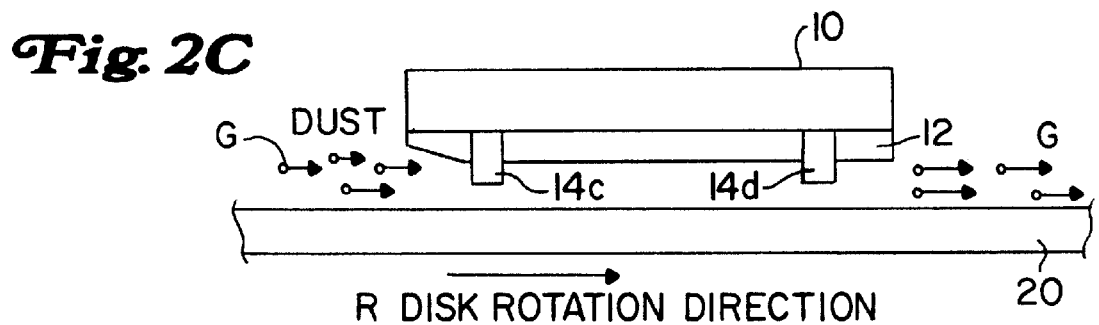
FIG. 2(c) is a side view showing the present invention in operation.
Figure 2D:
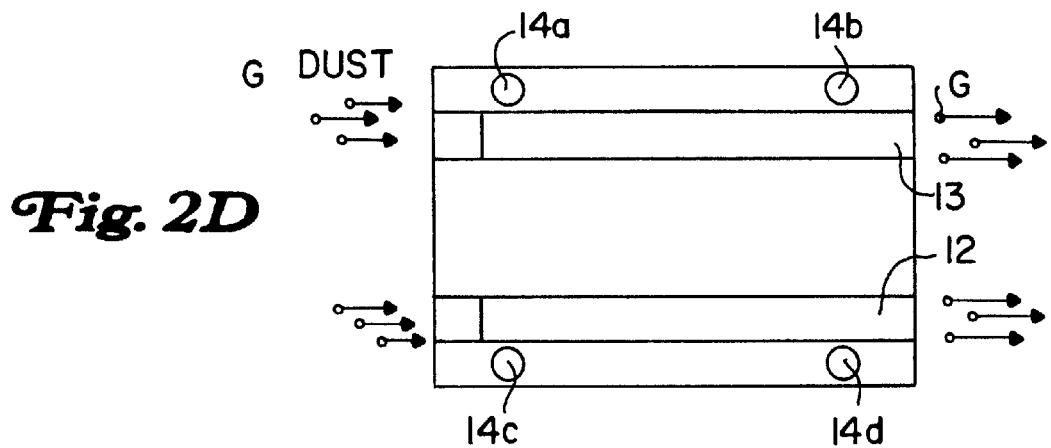
FIG. 2(d) is a bottom view showing the present invention in operation.

FIGS. 2(c) and 2(d) illustrate these functions, depicting the effects as viewed from the side and the state of the surface facing the disk (floating surface), respectively. Referring to the drawing, the head slider hovers (after storage media 20 starts to rotate) by coming into contact with the air flow moving over the rotating medium/disk in the direction of R. Also, dust G enters from the air inlet of the rail surfaces and passes through the air outlet.

Figure 1A:
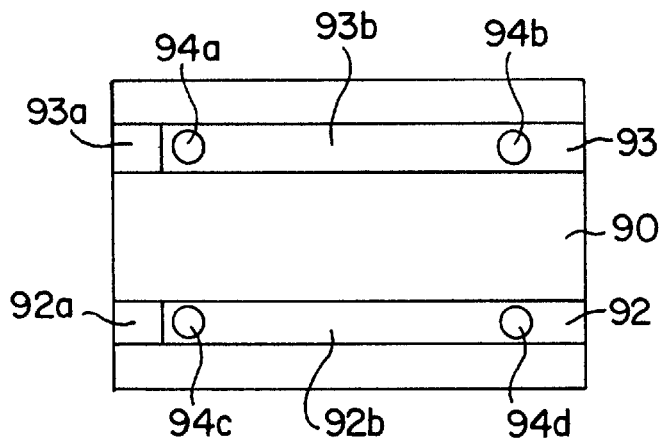
FIG. 1(a) is a bottom view showing the surface of a head slider facing the surface of a disk (floating surface) based on the previous art.
Figure 1B:
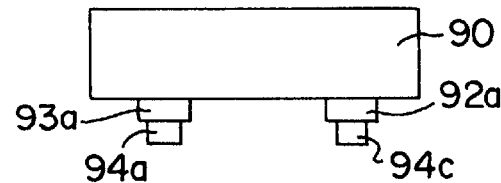
FIG. 1(b) is an end view showing the air inflow end of a head slider based on the known technology of FIG. 1(a)
Figure 1C:
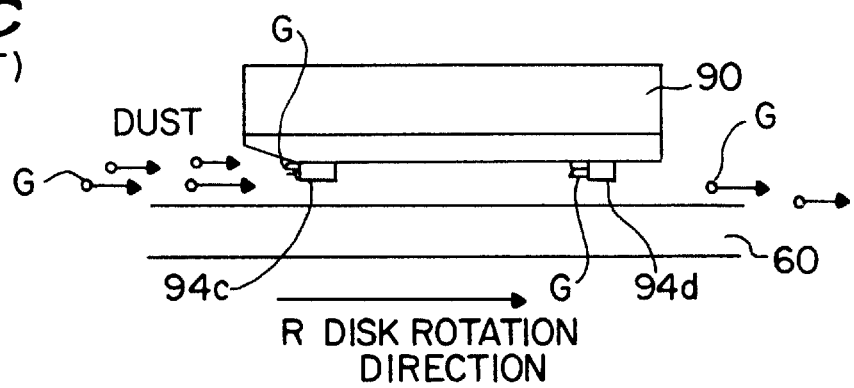
FIG. 1(c) is a side view showing dust accumulation in the device of FIG. 1(a)
Figure 1D:
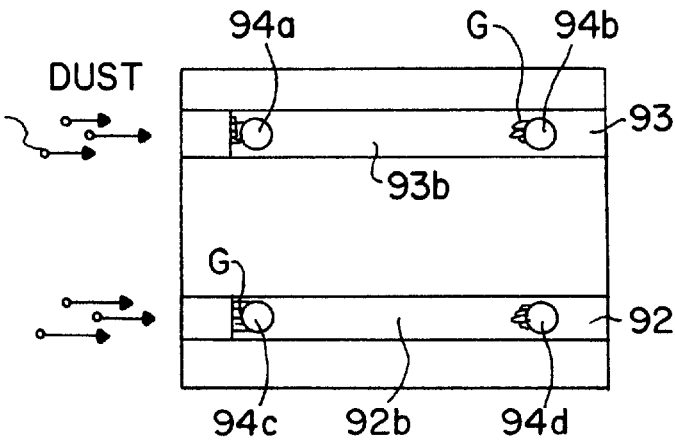
FIG. 1(d) is a bottom view showing dust accumulation in the device of FIG. 1(a)

The head slider 10 in this embodiment, unlike the one shown in FIGS. 1(c) and 1(d), has no obstacle to interfere with the air flow on rail surfaces 12b and 13b on slider rails 12 and 13, thereby resulting in substantially curbed accumulation of dust on the surfaces.

The process of manufacturing the slider with a head mounted will be described only in outline, since it is well known and already disclosed in Japanese Laid Open Patent No. Tokkai-Hei 8-69674, etc.

Layers of electromagnetic conversion elements are formed on a wafer-like base plate of materials such as Alumina Titanic Carbide (Al2O3TiC), ferrite, or Titanic Acid Calcium. The electromagnetic elements consist of, for example, magnetoresistive elements, inductive heads, and so on.

Next, the wafer is cut into sections to get complete individual sliders. The surface on which magnetic poles of electromagnetic elements are exposed will form the bottom surface over which the slider hovers.

The process of fabricating the head slider surface facing the disk (floating surface) will be described by referring to FIG. 3. As shown in the film forming process 1 in FIG. 3, a film of SiC 52 is formed to a thickness of about 5 nm on slider base plate 51 (including the electromagnetic conversion elements forming portion) by using film forming techniques such as sputtering, CVD, and vacuum metallizing. Next, protective film 53 of diamond-like carbon (referred to as DLC in this document) is formed on SiC film 52 to a thickness of about 10 nm by using film forming technology such as plasma CVD, sputtering or vacuum metallization.

Protective film 53 is a coating for protecting the slider rail surfaces and electromagnetic elements. SiC film 52 is formed to improve the stickiness between protective film 53 and base plate 51; therefore, it can be omitted if the stickiness is satisfactory.

Next, Si film 54 (about 2 to 5 nm) and DLC film 53 (about 20 to 50 nm) are formed on protective film 55. Si film 54 will become an etching stopper when DLC film 55 is patterned.

Figure 3:
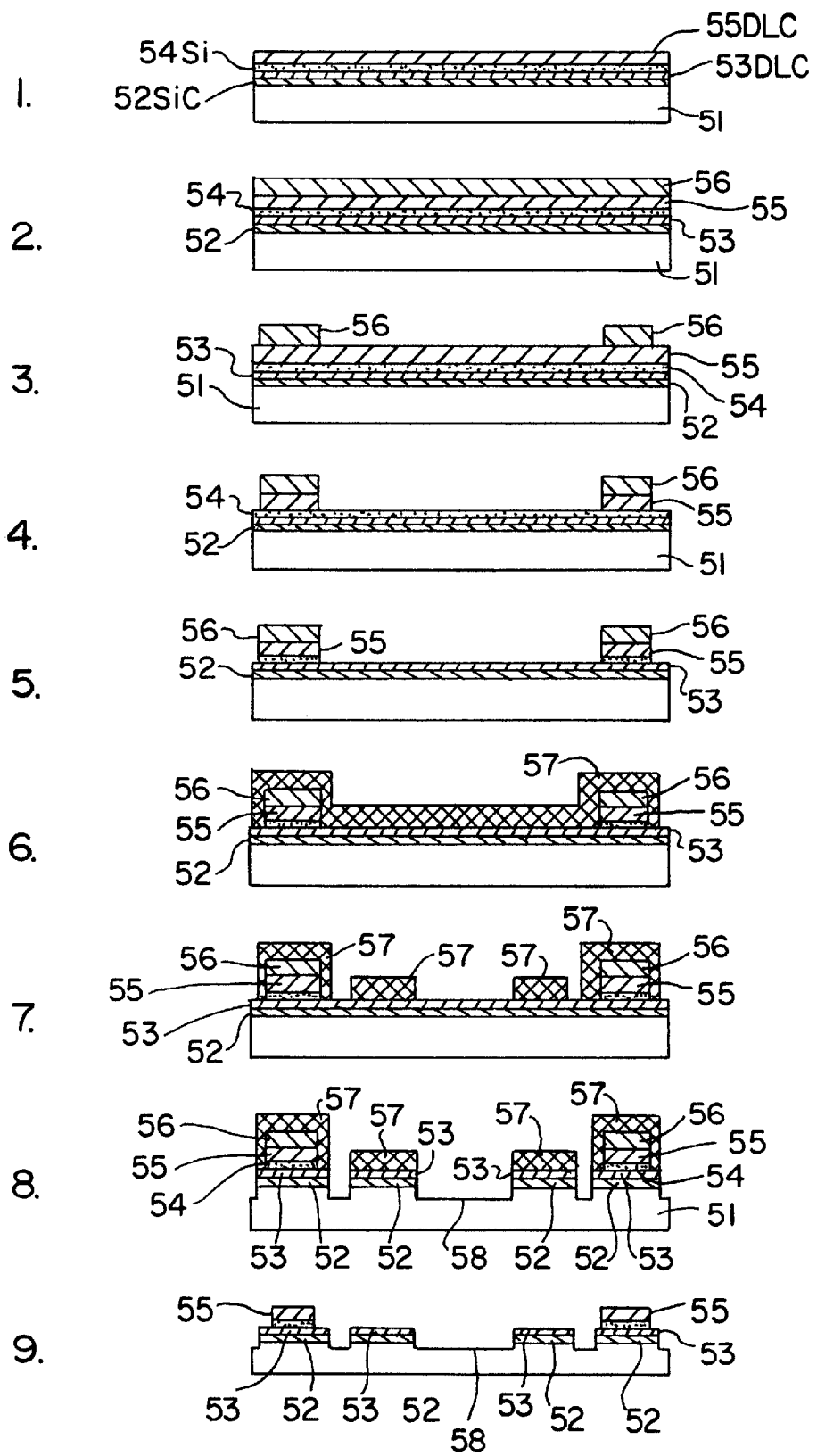
FIG. 3 is a flowchart showing the process for forming the floating surface of the first embodiment of the invention.

Then, as shown in film resist laminating process 2 in FIG. 3, a first film resist 56 is laminated onto DLC film 55 using a laminator. First film resist 56 is left on the pad forming portions by exposing and developing, as shown in exposure/ development process 3 in FIG. 3. The surface geometry of the floating side of first film resist 56 (after patterning) need not be circular, elliptical, or streamlined, provided it does not disturb the air flow when the disk is afloat and is unlikely to cause friction during CSS operation. First film resist 56 after patterning is used as the first mask.

Next, as shown in the DLC etching process (RIE) 4 in FIG. 3, base plate 51 processed in the manner mentioned earlier is put into reactive ion etching (RIE) equipment, and the portion of DLC film 55 not covered by first film resist 56 is subject to etching under the oxygen plasma generated in the equipment. This patterning process forms the pads from DLC film 55.

In this patterning process, since the etching rate of Si film 54 using oxygen plasma is negligible or zero, etching control for DLC film 55 can be carried out without difficulty. In addition, protective film 53 consisting of DLC, without being etched, covers the floating surface and the electromagnetic conversion elements. The etching process could be time controlled but may depend on the termination judgment for the etching based on the changes in wavelength in the plasma emission during etching.

Subsequently, as shown in etching process 5 in FIG. 3, Si film 54 is etched using the CF4 plasma to expose the surface protective film 53 consisting of DLC.

Next, as shown in film resist laminating process 6 in FIG. 3, a second film resist 57 is laminated, using the laminator again, onto base plate 51 that went through the process mentioned earlier, and thus second film resist 56 and protective film 53 are covered.

Subsequently, film resist 57 is exposed/developed and the areas other than those that become the pads and rail surfaces are removed, as shown in exposure/development process 7 in FIG. 3. Because electromagnetic elements are in the neighborhood of the rail surfaces, they are also covered by second film resist 57.

Figure 4:
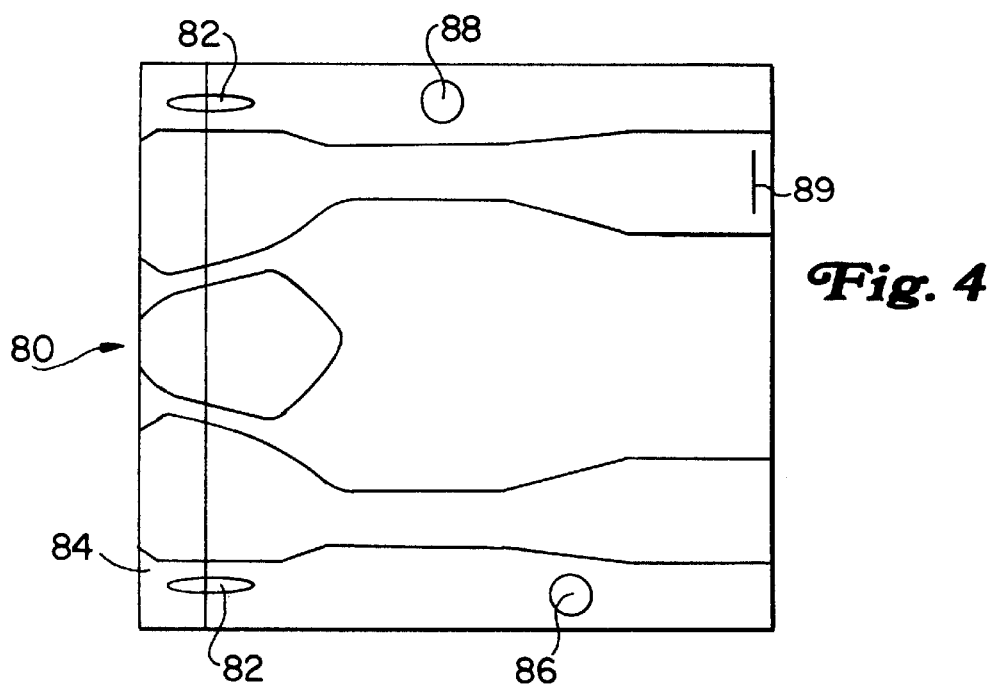
FIG. 4 is a bottom view of a second embodiment of the head slider of the present invention.

The shape of the rail surface is modifiable and can be interchanged with, for example, a fish-shaped GUPPY pattern, etc., as in FIG. 4 rather than the simple stripes adopted in this embodiment. It may also be possible to provide a third rail apart from the parallel side rails, that is, a center rail in the central area of a slider, also shown in FIG. 4. Thus, the rail surface geometry and the number of slider rails are subject to a variety of modifications, leaving room for opting between sliders of negative or positive pressure, and tuning to favorable floating characteristics. Also, the pads can have different shapes and locations on the base. For example, elliptical pads 82 can extend at least partially onto a tapered portion 84 of a slider 80. An additional pad 86 is provided on one side of the slider 80 to hold up the rear of the slider, and a fourth pad 88 is provided on the other side of the slider 80, to hold up the fourth corner, which includes a head element 89. A slider of this type is generally designed so that when floating, the head element 89 is closer to the disk than the other corners of the slider. For this reason, the pad 88 is moved up closer to the tapered surface 84 than the pad 86. However, the pad 86 is placed behind the center of the slider towards the head element 89, so that the slider can be parked stably on the disk.

Next, as shown in ion milling process 8 in FIG. 3, a dent 58 is formed by ion milling the surfaces of protective film 53, SiC film 52 and base plate 51 under the second mask formed by second film resist 57. This process forms rail surfaces and pads jutting out from the etched surface of base plate 51.

After this, first and second film resists 56 and 57 are removed with an acetone wash. First film resist 56 can be removed subsequently so that a "once-for-all" process will do, thereby improving throughput.

Head slider 10 is formed to have a disk interfacing configuration, as shown in FIGS. 2(a) and 2(b). Therefore, DLC film 55 on the inward base plate and the outward base plate are adjacent to the surfaces of slider rails 12 and 13, thereby forming the pads on surfaces 10b on the outer surfaces of the base plate.

Figure 5A:
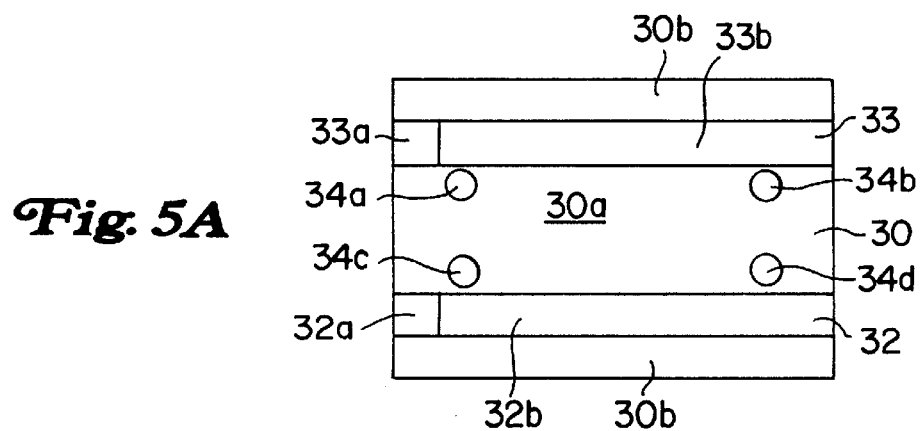
FIG. 5(a) is a bottom view showing the surface of a head slider facing a disk (floating surface) based on a third embodiment of the present invention.
Figure 5B:
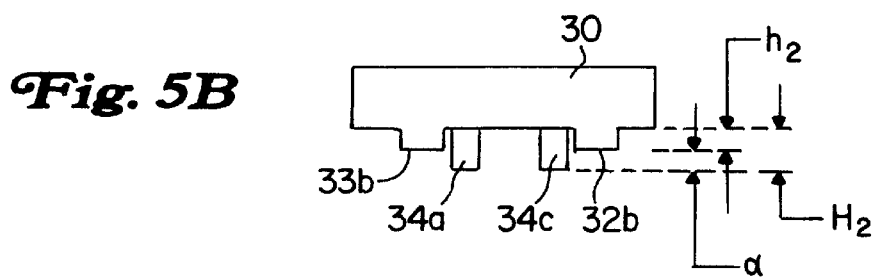
FIG. 5(b) is a front view showing the air inflow end of a head slider based on the third embodiment of the present invention.

FIGS. 5(a) and 5(b) show the head slider of the second embodiment of the invention. FIG. 5(a) depicts the surface facing the disk (floating surface) and FIG. 5(b) depicts the air inlet end.

Two slider rails (also known as side rails) 32 and 33 project between areas 30a and 30b of a slider 30 and extend lengthwise on respective sides of a base plate 30 (in a direction parallel to the air flow). Slanting surfaces 32a and 33a on slider rails 32 and 33 introduce an air flow, then the hovering effect (or lift) is generated by rail surfaces 32b and 33b on slider rails 32 and 33.

Pads 34a, 34b, 34c, and 34d extend outwardly from the area 30a of the base plate inside the rail surface 32b, 33b fitted on slider rails 32 and 33. Thus, base plate surface 30a has sufficient area to create room for selecting appropriate shapes and numbers of pads and so forth, for suitable floating characteristics, air resistance, friction during CSS and so on. Unlike head slider 10, there is no need to enlarge the width of base plate 30b in accordance with the pad size. The formation process is thereby facilitated and is particularly suitable for small head sliders.

The air intake ends of the pads are preferably formed in a streamline shape to reduce air resistance and disk friction during CSS operations. In this embodiment, for the sake of convenience, all pads are shown as circular. However, it is possible to further reduce the air resistance and disk friction during CSS operations by using pads having sharp elliptical cross-sections, or ones having longitudinally slender streamlined cross-sections.

The pad height H2 (height from plate surfaces 30a and 30b) is greater than the height of slider rail h2 (height from plate surfaces 30a and 30b). In this embodiment, formation will be illustrated using an example of a head slider measuring about 1.0 mm W, about 1.2 mm L, and about 0.3 mm H. The slider rail height h2 is about 3 $\mu$m and the pad height is about 3 $\mu$m+$\alpha$ (jutting amount). In this embodiment, the pad height jutting amount is set to about 50 nm.

If the jutting amount $\alpha$ is set to 0 nm, the pad does not function as a "pad-disk adsorption prevention device" since the rail surfaces come directly into contact with the surface of the disk during CSS operations. Any height sufficient to prevent adsorption can be used, but $\alpha$ must be greater than 0 nm in the absence of a unique disk design. The pads should preferably jut more than 10 nm when durability under practical use conditions is taken into consideration, since the pads come into contact with the disk during CSS operations and could be gradually defaced. If a disk system is used over an extended period or is driven very frequently, the pad jutting amount is preferably 30 to 60 nm. However, it goes without saying that the pad height H2 or the jutting amount $\alpha$ need not be confined to these limits but can be determined in accordance with the dimensions of the head slider and its electromagnetic conversion response.

With regard to slider 30, rail surfaces 32b and 33b are formed on slider rails 32 and 33, respectively, and basin area 30b is provided between rail surfaces 32b and 33b.

Although roughly sketched in the figures presented, the air outlet (rear end) of slider 30 is maintained at a level lower than the air inlet (front end) in the actual embodiment, because slanting surfaces 32i aand 33a meet the air pressure with fixed attack angles when slider 30 is afloat.

In this embodiment, four pads are formed on both ends, that is, two near the air inlet end and another two near the air outlet end. In other words, pads in all four corners are preferable for supporting the slider during CSS operations. Thus, it is possible to prevent any portions of the slider other than the pads from coming into contact with, and sticking to a disk.

Head slider 30 in this embodiment, like head slider 10 mentioned earlier, has no obstacle to interfere with the air flow on rail surfaces 32b and 33b on slider rails 32 and 33, thereby resulting in substantially curbed accumulation of dust on the surfaces.

The process of manufacturing the slider with a head mounted will be described only in outline, since it is well known and already disclosed in Japanese Laid Open Patent No. Tokkai-Hei 8-69674, etc. Layers of electromagnetic conversion elements are formed on a wafer-like base plate fabricated of materials such as Alumina Titanic Carbide (Al2O3TiC), ferrite, or Titanic Acid Calcium. The electromagnetic elements consist of, for example, magnetoresistive elements, inductive heads, and so on.

The wafer is cut into sections to obtain complete individual sliders. The surface on which magnetic poles of electromagnetic elements are exposed will form the bottom surface over which a slider hovers.

The process of fabricating the head slider surface facing the disk (floating surface) will be described by referring to FIG. 6. As shown in the film forming process 1 in FIG. 6, a film of SiC 62 is formed to a thickness of about 5 nm on slider base plate 61 (including the electromagnetic conversion elements forming portion) by applying film forming techniques such as sputtering, CVD, and vacuum metallizing. Next, protective film 63 consisting of diamond-like carbon (referred to as DLC in this document) is formed on SiC film 62 to a thickness of about 10 nm by applying a film forming technology such as plasma CVD, sputtering, or vacuum metallization.

Protective film 63 is a coating for protecting the slider rail surfaces and electromagnetic conversion elements. SiC film 62 is formed to improve the stickiness between protective film 63 and base plate 61. Therefore, it can be omitted if the stickiness is satisfactory.

Next, Si film 64 (about 2 to 5 nm) and DLC film 65 (20 to 50 nm) are formed on protective film 63. Si film 64 will become an etching stopper when DLC film 65 is patterned.

Figure 6:
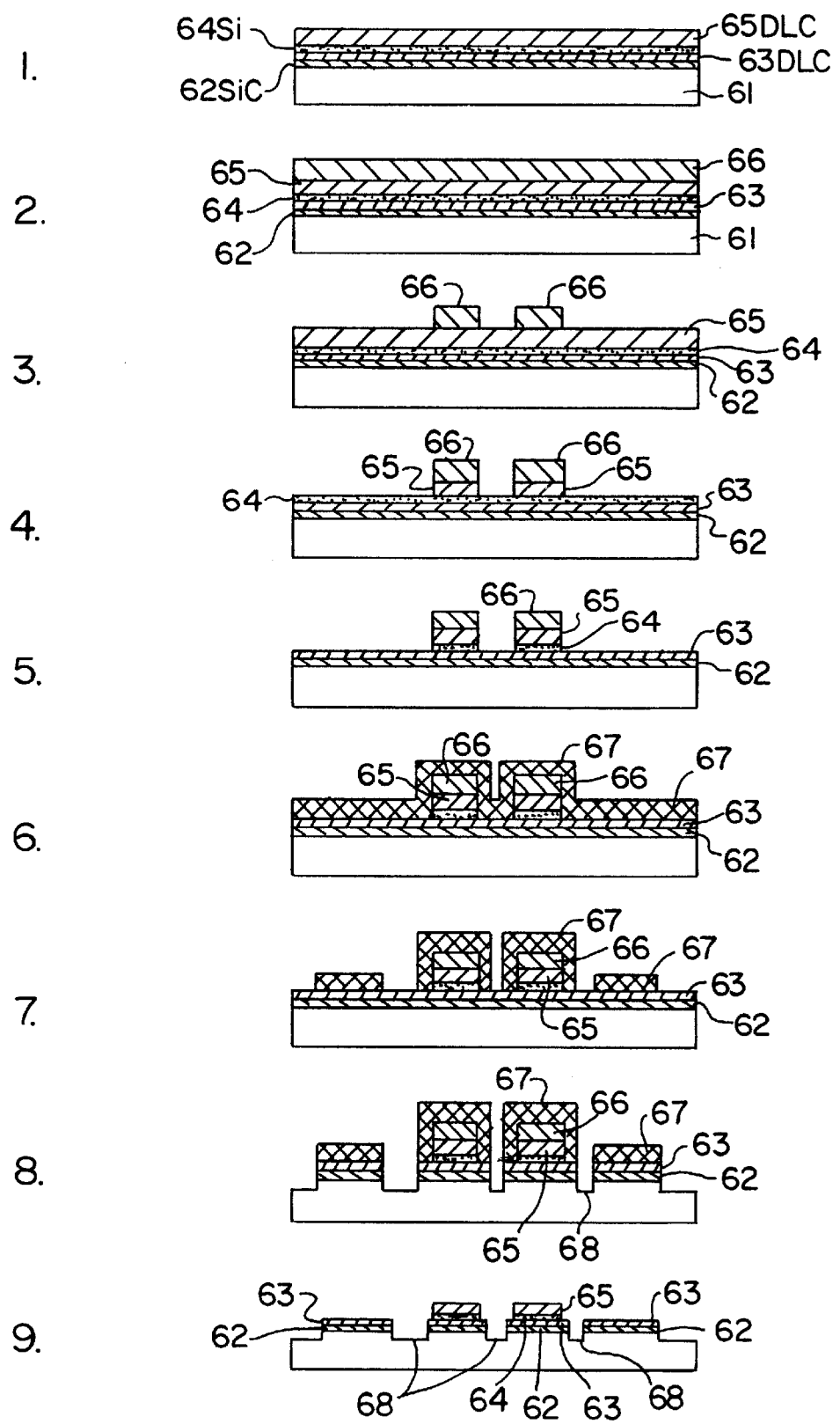
FIG. 6 is a flowchart showing the process for forming the floating surface of the third embodiment of the invention.

Then, as shown in film resist laminating process 2 in FIG. 6, a first film resist 66 is laminated onto DLC film 65 using a laminator. First film resist 66 is left on the pad forming portions by exposing and developing, as shown in exposure/development process 3 in FIG. 6. The surface geometry of the floating side of first film resist 66 (after patterning) need not be circular, elliptical, or streamlined, provided it does not disturb the air flow when the disk is afloat and is unlikely to cause friction during CSS operation. First film resist 66 after patterning is used as the first mask.

Next, as shown in the DLC etching process (RIE) 4 in FIG. 6, base plate 61, which went through the process mentioned earlier, is put into reactive ion etching (RIE) equipment and the portion of DLC film 65 not covered by first film resist 66 is subject to etching under the oxygen plasma generated in the equipment. This patterning process forms the pads from DLC film 55.

In this patterning process, since the etching rate of Si film 64 by the oxygen plasma is negligible or zero, the etching control of DLC film 65 can be carried out without difficulty. In addition, protective film 63, without being etched, covers the floating surface and the electromagnetic conversion elements. The etching process could be time controlled, but the time for etching may be determined by measuring changes in wavelength in the plasma emission during etching.

Subsequently, as shown in etching process 5 in FIG. 6, Si film 64 is etched using the CF4 plasma, to expose to the surface protective film 63 consisting of DLC.

Next, as shown in film resist laminating process 6 in FIG. 6, second film resist 67 is laminated, using the laminator again, onto base plate 61 that went through the process mentioned earlier, and thus second film resist 66 and protective film 63 are covered.

Subsequently film resist 67 is exposed/developed and the areas other than those that become the pads and rail surfaces are removed, as shown in exposure/development process 7 in FIG. 6. Because electromagnetic elements are near the rail surfaces, they are also covered by second film resist 67.

The shape of the rail surface is modifiable and can be interchanged with, for example, a fish-shaped GUPPY pattern, etc., rather than the simple stripes adopted in this embodiment. It may also be possible to provide a third rail apart from the parallel side rails, that is, a center rail in the central area of a slider. Thus, the rail surface geometry and the number of slider rails are subject to a variety of modifications, leaving room for opting between sliders of negative or positive pressure, and tuning to favorable floating characteristics.

Next, as shown in ion milling process 8 in FIG. 6, a dent 68 (corresponding to base plate surface 30a in FIG. 3) is formed by ion milling the surfaces of protection film 63, SiC film 62, and base plate 61 under the second mask formed by second film resist 67. This process forms rail surfaces and pads jutting out from the etched surface of base plate 61.

After this, as shown in resist removing process 9 in FIG. 6, first and second film resists 66 and 67 are removed by washing with acetone. First film resist 66 can be removed subsequently so that a "once-for-all" process will do and thus throughput is improved.

Head slider 30 is formed to have a disk interfacing configuration, shown in FIGS. 5(a) and 5(b). Therefore, DLC film 65 placed on the inward base plate corresponds to the pad surfaces, and DLC film 65 placed on the outward base plate corresponds to the surface of slider rails 12 and 13, thereby forming the pads on surfaces 10a or the outer surfaces of the base plate.

Pads, as described in the first and second embodiments, need not be formed exclusively inside or outside the slider rails but may be formed in either side to support the slider properly and to function competently as an adsorption prevention device. Furthermore, the pads' adsorption prevention functions are satisfactorily attained regardless of the parallel offsetting, be it inside or outside the rails, if located at the front or rear of the air gateways.

One or more pads are effective themselves if only such pads are installed, because they prevent entire areas from coming into contact with the disk surface, thereby preventing the occurrence of excessively large drag resulting from adsorption. Therefore, the motor torque and/or energy can be reduced to help miniaturize the driving motor and reduce power consumption.

Two or more pads can support a slider and reliably isolate rail surfaces and the disk surface, thus preventing adsorption.

Furthermore, as mentioned earlier in the first and second embodiments, a pad is formed by patterning the DLC film. On the other hand, since the rail surfaces will no longer come into contact with the disk, the protection film covering the rail surfaces and electromagnetic elements can consist of a single layer of silicon, silicon carbon, or silicon dioxide.

In such a layer configuration, the rail surfaces are coated with protective coatings 5a of silicon, silicon carbon, or silicone dioxide. The thickness of the film formed by either silicon, silicon carbon, or silicon dioxide should be, for example, about 5 nm. This layer structure will reduce the time needed for film forming, resulting in higher throughput.

Since pads themselves contact the disk, they should be made of relatively hard materials. In the first and second embodiments, diamond-like carbon was employed. However, ceramics materials will also do. The hardness can be set to around 2,500 when carbonic materials such as diamond-like carbon or amorphous carbon are used. Boride, carbide, and nitride will also do.

In a disk system, a lubricating coating is applied to the disk surface for the most part. When carbo-fluoride materials containing benzoyl are used as the lubricating coating, the lubricant ingredients can easily be moved to the surface if the pad surface is covered with carbonic coating or the pad itself is formed by carbonic materials. When using liquid carbo-fluoride materials containing hydrobase, the lubricant ingredients can easily be moved to the surface if the pad surface is covered with oxidic coating (e.g., Al2O3, SiO2) or the pad itself is formed using these materials.

When a lubricant is applied to a pad, its lubricating condition is improved, resulting in a reduced friction coefficient between the pad and the disk. Therefore, the damage on the surface of the disk storage medium due to contact resulting from sliding can be minimized with the pad.

Figure 7A:
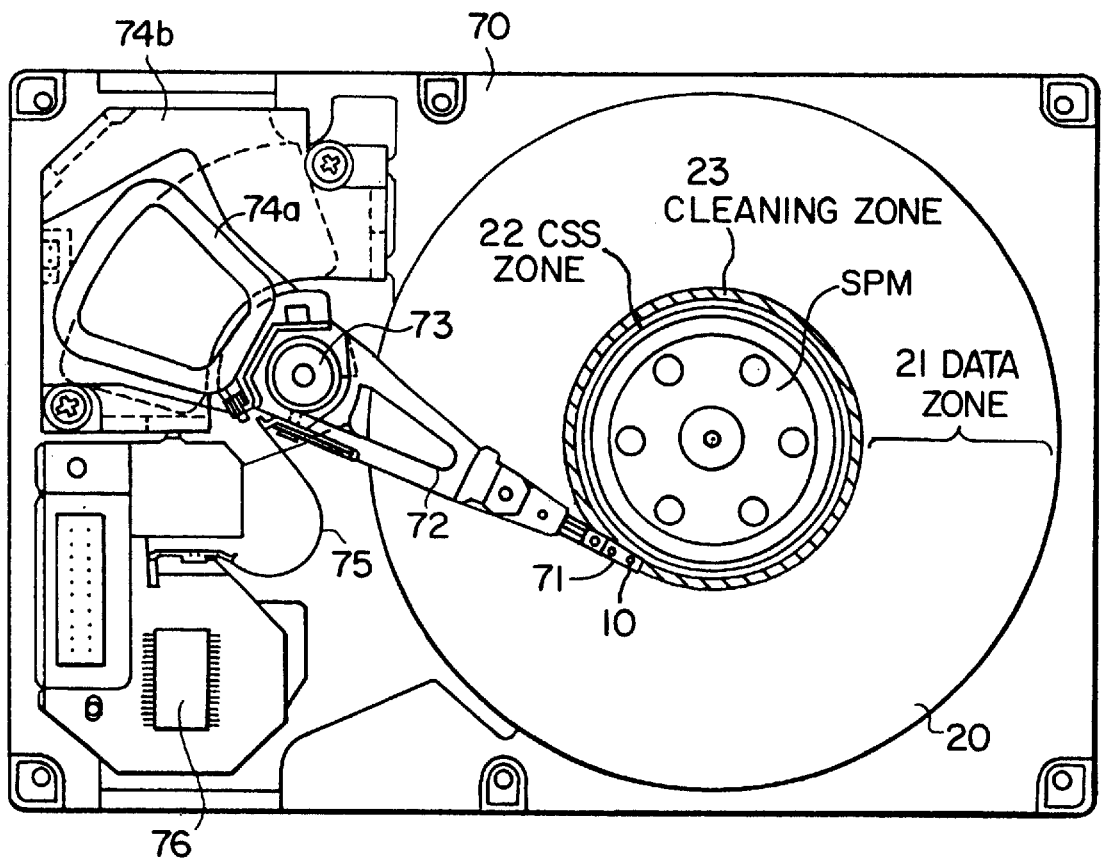
FIG. 7(a) is a plan view of a disk system based on a first embodiment of a disk arrangement of the present invention.

FIG. 7(a) shows a disk system equipped with a head slider 10. Head slider 10 is installed on the pointed end of suspension 71, and the other end is secured on actuator arm 72. A voice coil motor having an actuator coil portion 74a and magnetic circuit 74b is arranged on the base of the disk system.

The motion of head slider 10 is pivoted on a rotational axis 73 and controlled in the radial direction of disk 20. The signals read or written by head slider 10 are derived by means of a flexible print circuit 75, to be processed in head control circuit 76.

Figure 7B:
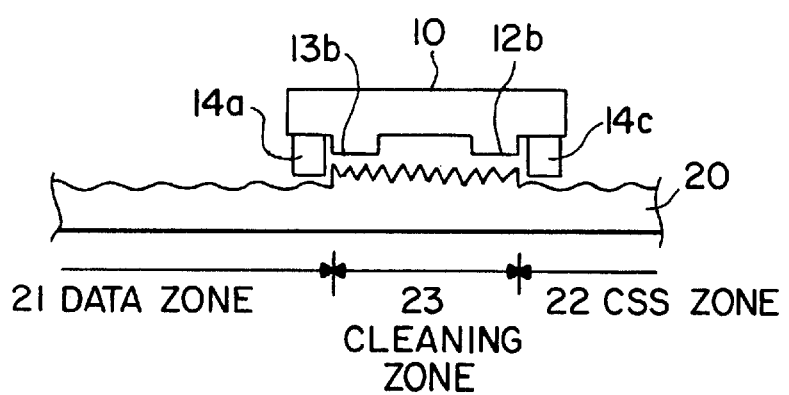
FIG. 7(b) is an enlarged view of a portion of the disk system of the first embodiment of the disk arrangement of the present invention.

FIG. 7(b) is a partially enlarged view to illustrate the method of cleaning the rail surfaces of head slider 10. In the case of a slider with pads, the rail heads do not come into contact with the disk surface, and therefore it is impossible to remove the dust on the rail surfaces once it has collected.

As a result, cleaning zone 23, which contacts the rail surfaces, has to be provided on the disk surface. FIGS. 7(a) and 7(b) show an example of placing the cleaning zone 23 between data zone 21 and CSS zone 22.

Cleaning zone 23 is provided with a surface roughness greater (Average about Ra 40 to 50 Å) than those of data zone 21 and CSS zone 22 (Average about Ra 30 Å). Also, the roughness (average surface protrusion) is set coarser (higher) than the protrusion amount α of pads 14a, 14b, 14c, and 14d which are placed outside both side rails of head slider 10.

Furthermore, the cleaning width of cleaning zone 23 is made slightly narrower than the distance between both side pads, i.e., 14a and 14c, 14b and 14d, or not exceeding the overall width between 12b to 13b including the rail width.

If the cleaning width is determined as mentioned above, the cleaning of the rail surfaces is feasible when slider 10 is in an on-tracking mode in the cleaning zone. Of course, the cleaning width of the cleaning zone can be made narrower than the example presented in this embodiment so as to "trade" for the capacity of the data zone by means of the control circuit to oscillate slider 10 radially, as will be seen later.

The above configuration will make it possible to let rail surfaces 12b and 13b come into sliding contact with cleaning zone 23 without letting pads 14a, 14b, 14c, and 14d come into contact with the disk surface.

In the control circuit mentioned later, slider 10 will pass through cleaning zone 23 to and from CSS zone 22, that is, accessing any of the target tracks. Therefore, cleaning is performed as a usual practice and there is no need for any special control to move the slider to cleaning zone 23.

The cleaning zone is laid circumferentially, either continuously or intermittently. Multiple cleaning zones can be arranged with a radial interval as required.

Unlike this embodiment, CSS zone 22 may be laid in the outermost position to insert a cleaning zone between data zone 21 and the CSS zone 22. This arrangement also meets the requirement as expected.

Although the surface roughness of cleaning zone 23 is higher than that of the other areas, slider 10 will take a posture to step over cleaning zone 23, triggered by abutting the projection of the boundary surface in the course of radial movement, as shown in FIG. 7(b).

Figure 8A:
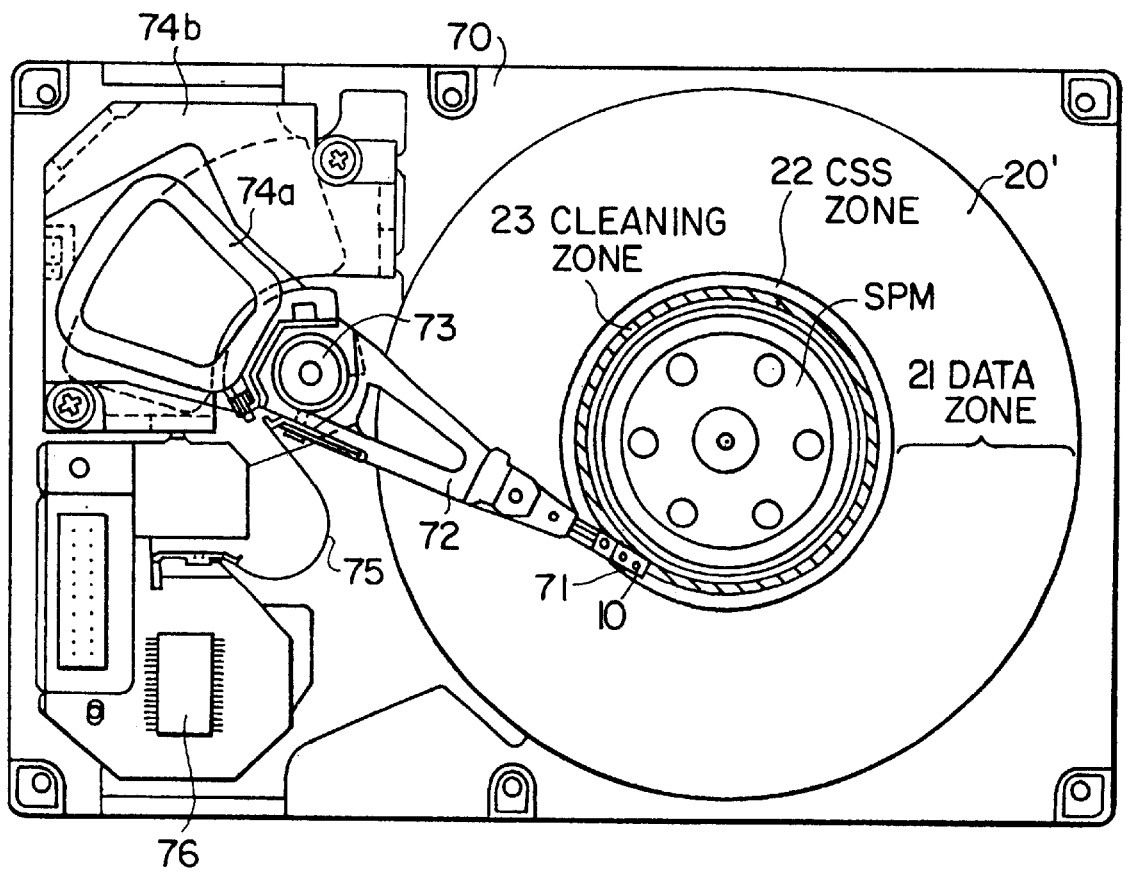
FIG. 8(a) is a plan view of a disk system based on a second embodiment of the disk arrangement of the present invention.
Figure 8B:
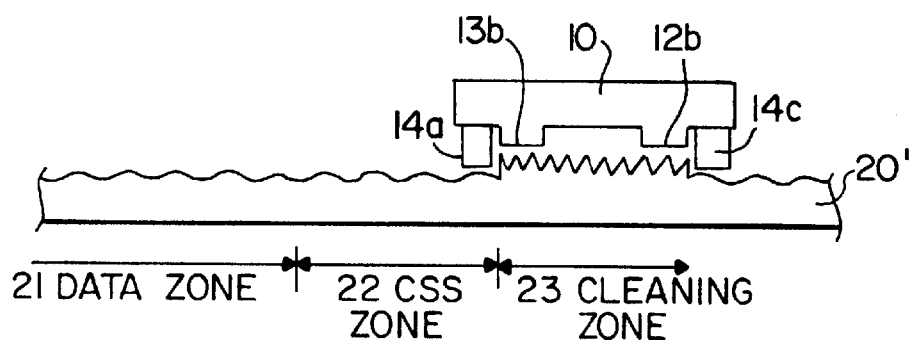
FIG. 8(b) is an enlarged view of a portion of the disk system of the second embodiment of the disk arrangement of the present invention.

FIGS. 8(a) and 8(b) show an example of cleaning zone 23 arranged on the 20 innermost tracks. Accordingly, cleaning zone 23, CSS zone 22, and data zone 21 are arranged toward the outward centrifugal direction in that order. The other examples of disk configurations are identical with the one shown in FIG. 7(a), so their explanation will be omitted.

In short, the formation (manufacture) of areas having roughness greater than the pad projection will be facilitated by making cleaning zone 23 innermost. By contrast, it is also possible to make CSS zone 22 innermost.

Although cleaning zone 23 in the embodiment shown in FIG. 6 has to be accessed each time the pad comes in and leaves from the CSS, this embodiment can control the number of accesses, because access to cleaning zone 23 itself requires control, thereby minimizing the pad wear caused by the pad passing through the cleaning zone too frequently.

If the data zone and the cleaning zones are adjoining, recording or playing signals may occasionally be modified due to the projection of the surface medium in the cleaning zone. In some cases the slider floating function tends to fluctuate at the border between the data and cleaning zones, with the resultant negative influence on recording/playing responses caused by the disabled control of gaps between the recording medium and electromagnetic elements.

This notwithstanding, in the case of this embodiment, since the cleaning zone is installed adjoining the CSS zone free from the recording data, there is no negative influence on recording/playing responses near the border, or a special need for a compensation zone. Therefore, the full capacity of the data zone is available.

Moreover, the head movement toward cleaning zone 23 is conducted by the control circuit mentioned later, to ensure the proper cleaning time to optimize the cleaning operation.

Figure 9A:
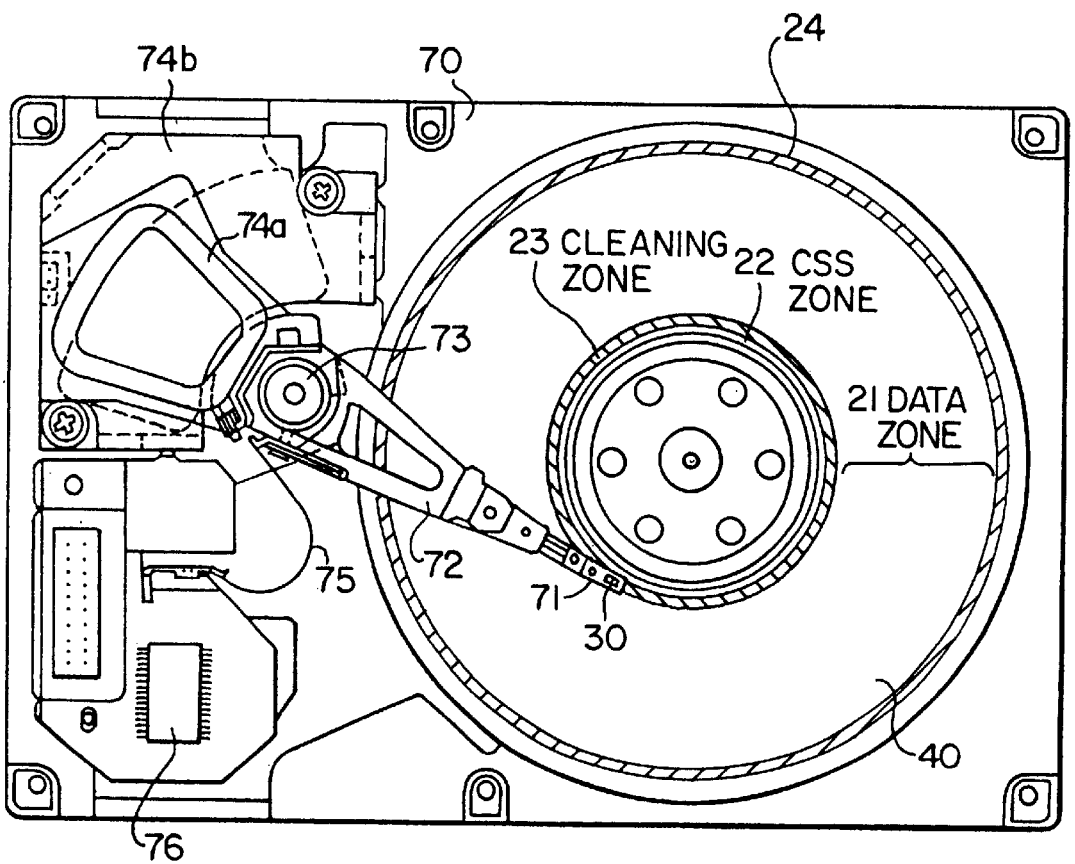
FIG. 9(a) is a plan view of a disk system based on a third embodiment of the disk arrangement of the present invention.
Figure 9B:
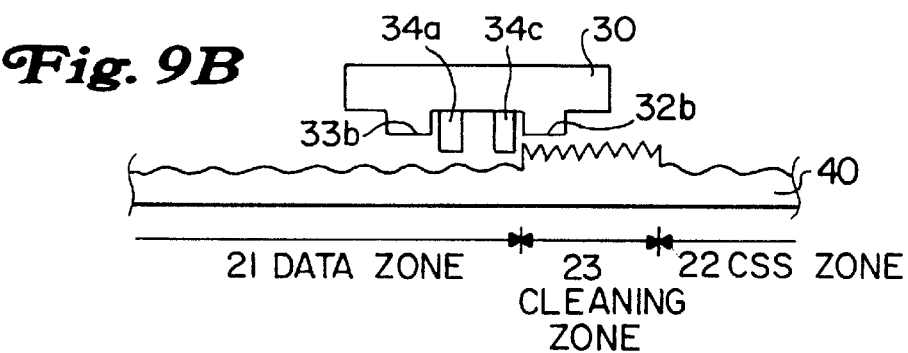
FIG. 9(b) and FIG. 9(c) are enlarged views of portions of the disk system of the third embodiment of the disk arrangement of the present invention.
Figure 9C:
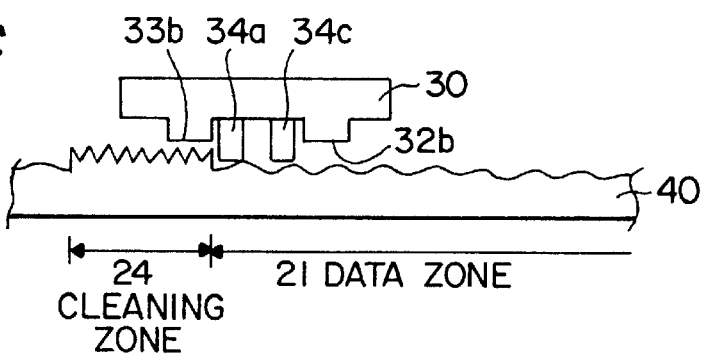

FIGS. 9(a), 9(b), and 9(c) show a disk system employing head slider 30. Since pads 34a, 34b, 34c, and 34d of head slider 30 are installed inside the rail surfaces 32 and 33, they will probably be defaced if both rail surfaces are simultaneously cleaned using the disk configuration shown in FIG. 7 and FIG. 8.

Therefore, in this embodiment the rail surfaces are cleaned one at a time. That is, inner rail surface 32 of disk 40 is cleaned by inner cleaning zone 23, and outer rail surface 33 is cleaned by the outer cleaning zone 24. In other words, two cleaning zones are provided to clean the surface, an inner one and outer one.

Disk 40 shown in FIG. 9(a) and FIG. 9(b) is a particular case of installing the inner cleaning zone 23 between the data zone 21 and the CSS zone 22.

Cleaning zones 23 and 24 have a higher surface roughness (average surface protrusion) than data zone 21 and CSS zone 22. In addition, the roughness of the cleaning zones is coarser (higher) than the projection of pads 34a, 34b, 34c, and 34d located outside the rail surfaces of slider 30. Therefore, rail surfaces 32b and 33b can come in contact, resulting from sliding, with cleaning zones 23 and 24 without thrusting pads 34a, 34b, 34c, and 34d against the disk surface.

Cleaning zones 23 and 24 that are slightly wider than the rail surfaces are sufficient for cleaning purposes.

The cleaning zones may be laid about a circumference of the disk, either continuously or intermittently, and multiple cleaning width areas can be installed radially. Additionally, CSS zone 22 may be laid in the outermost position to arrange a cleaning zone 24 between the data zone 21 and the CSS zone. This arrangement will also produce the desired results.

Under the influence of the control circuit mentioned later, the slider 30 will pass through the cleaning zone 23 to and from the CSS zone 22, each time the control circuit accesses the CSS. Therefore, the cleaning is accomplished during normal operation, and there is no need for special control to move the slider to the cleaning zone 23.

Although cleaning zone 23 has a higher surface roughness than the other areas, during the cleaning procedure the rail surface 32B will ride over the cleaning zone 23, and the pads 34c and 34b will abut the projection of the cleaning zone 23 in the course of radial movement of the slider 40, as shown in FIG. 9(b). Likewise, as shown in FIG. 9(c), rail surface 33b will ride over the cleaning zone 24, and pads 34a and 34b will abut the projection of cleaning zone 24. Thus, the pads 34a, 34b, 34c, and 34d will remain better preserved against wear.

Figure 10A:
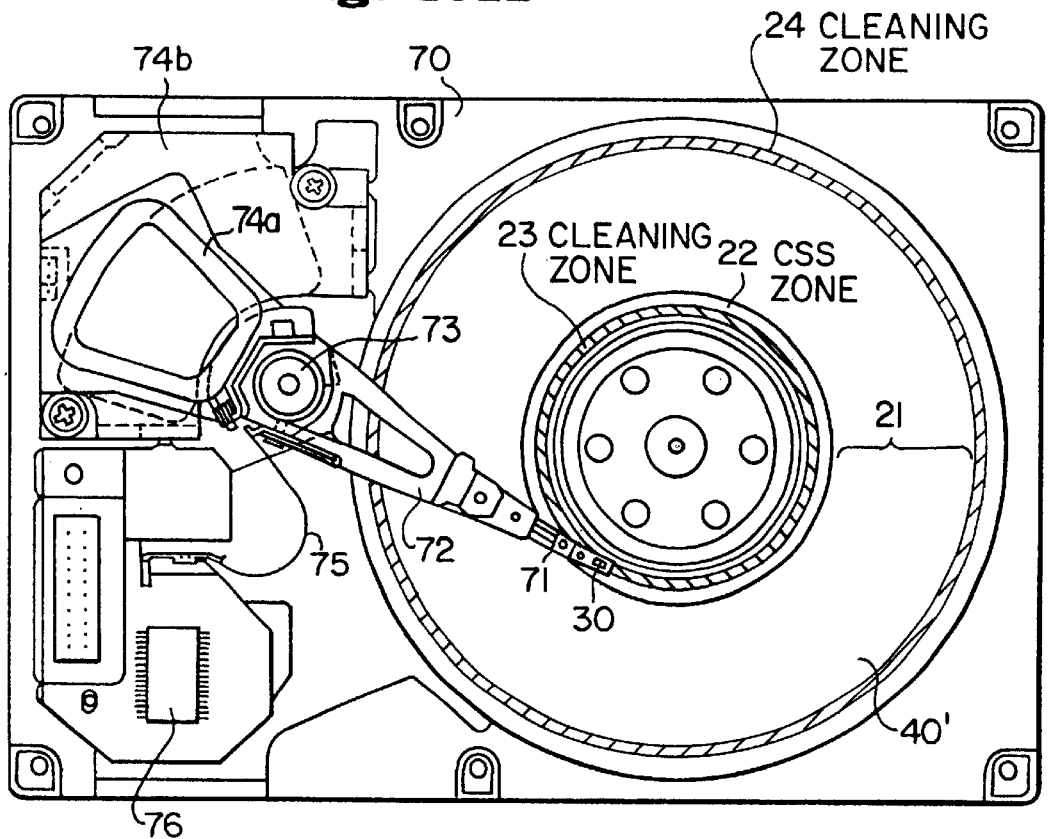
FIG. 10(a) is a plan view of a disk system based on a fourth embodiment of the disk arrangement of the present invention.
Figure 10B:
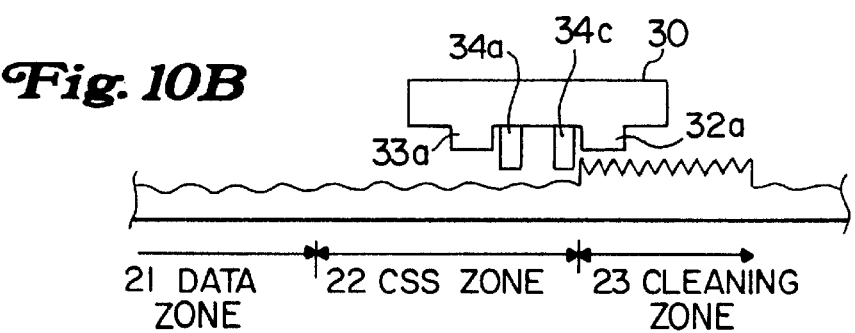
FIG. 10(b) and FIG. 10(c) are enlarged views of portions of the disk system based on the fourth embodiment of the present invention.
Figure 10C:
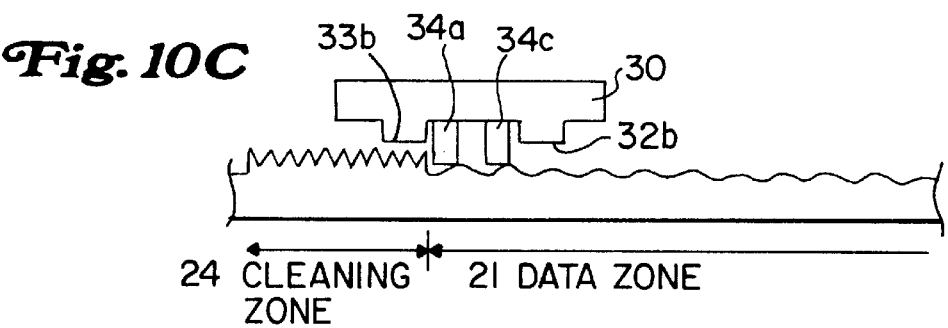

FIGS. 10(a), 10(b), and 10(c) show an example of the cleaning zone 23 arranged innermost. Accordingly, the cleaning zone 23, CSS zone 22, and data zone 21 are arranged on the disk 40, respectively, from the innermost part of the disk 40 to the outermost portion. As for the other disk configurations, arrangements are identical with one shown in FIG. 9(a), so their explanation will be omitted.

In short, the formation (manufacture) of areas having a roughness greater than the pad projection will be facilitated by making cleaning zone 23 innermost. By contrast, it is also possible to make cleaning zone 24 outermost in a similar manner.

While the cleaning zone 23 in the embodiment shown in FIG. 7 must be accessed each time the pad comes in and leaves from the CSS, in the present embodiment the number of times the pad accesses the cleaning zone 23 can be controlled, thereby minimizing the pad wear caused by the pad passing through the cleaning zone too frequently.

If the data zone and the cleaning zones are adjoining, recording or playing signals may occasionally be modified due to the projection of the surface medium in the cleaning zone. In some cases the slider floating function tends to fluctuate at the border between the data and cleaning zones, with a resultant negative effect on recording/playing responses caused by the difficulty in controlling gaps between the recording medium and electromagnetic elements.

This notwithstanding, in the case of the present embodiment, since the cleaning zone is installed next to the CSS zone free from the recording data, there is no negative influence on recording/playing responses near the border or a special need for a compensation zone. Therefore, the full capacity of the data zone is available.

In this embodiment, the head movement toward cleaning zone 23 is conducted by the control circuit mentioned later, and a proper cleaning time is ensured to optimize the cleaning operation.

As explained above, the surface roughness of cleaning zones 23 and 24 can be adjusted by mechanical machining or laser texturing machining to an appropriate level. The geometry is also modifiable by applying texture machining to the disk plate on which a film of recording medium is formed, or in some cases to the under layer. Alternatively, the roughness can be increased by means of some other agent treatment or film forming technique.

Figure 11:
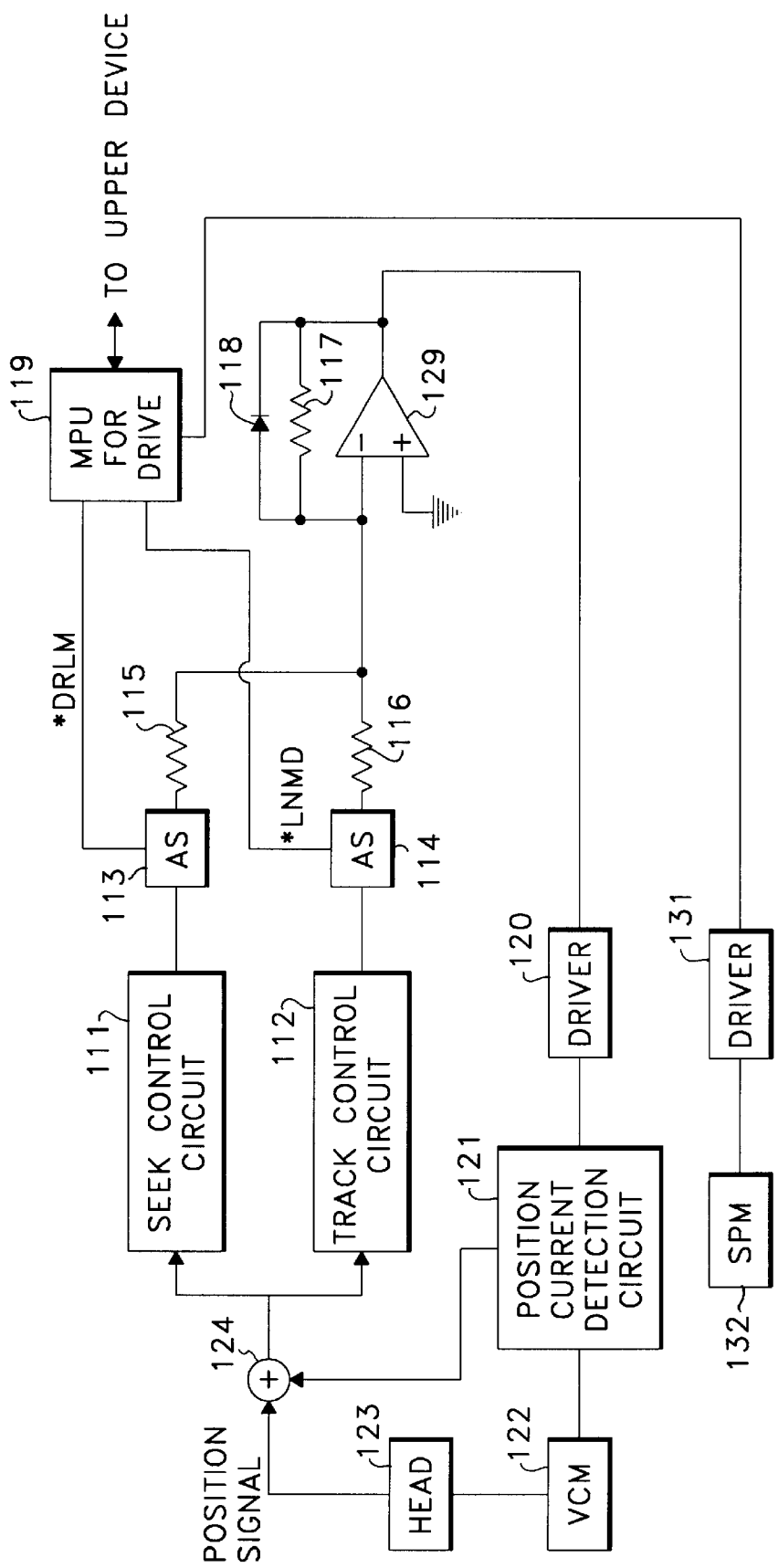
FIG. 11 is a block diagram of a drive control for a disk system based on the present invention.

FIG. 11 is a block diagram of a drive control for a disk system used for head movement. The motion of the actuator arm is regulated by seek control circuit 111 in charge of radial movement control, and tracking control circuit 112 in charge of circumferential tracking, to accomplish head movement. Since such control circuits are well known and have already been disclosed in Japanese Laid Open Patent No. Tokkai-Hei 5-274831, etc., only an outline will be given.

Seek control circuit 111 controls the head speed toward the target track position based on the seek command from the upper device, which gives instructions to a driving MPU 119. The output from the seek circuit 111 is input to integrated-circuit amplifier 129 via analog switch 113 and resistor 115, and then used to drive a voice coil motor (VCM) via driver 120. Analog switch 113 is kept closed during the seek control on receipt of *DRLM signals from driving MPU 119.

The output signals from tracking control circuit 112 enter amplifier 129 via analog switch 114 and resistor 116 and drive VCM 122 via analog driver 120.

Analog switch 114 is kept closed on receipt of *LNMD signals from the driving MPU 119. That is, analog switch 113 is turned ON and analog switch 114 is turned OFF when the seek control is under way. On the other hand, analog switch 114 is turned ON and analog switch 113 is turned OFF when the operation is changed to the tracking control.

The output stage of driver 120 is provided with position current detecting circuit 121 to detect the driving current supplied to VCM 122, and the current detected by position current detecting circuit 121 is applied to adding point 124. Adding point 124 receives the position signals demodulated based on the reading signals from the disk generated by head 123. The signals, including the position signals and the drive current detecting signals, are applied as feedback signals for seek control circuit 111 and tracking control circuit 112.

The rotational speed of spindle motor 132 (SPM) turning the disk can be controlled by commands given to driver 131 via the driving MPU 119.

The method for accessing the cleaning zone explained above is as follows.

Figure 12:
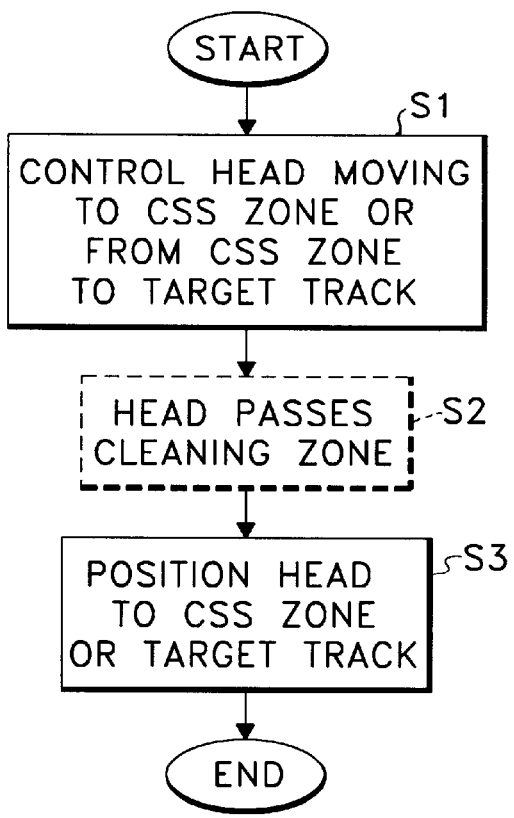
FIG. 12 is a flowchart showing a sequence for accessing a cleaning zone in the present invention.

FIG. 12 shows the access method for the configuration in which cleaning zone 23 shown in FIG. 7 and FIG. 9 is arranged between the CSS zone 22 and the data zone 21.

On starting the disk rotation, head slider 10 or 30 stationed at CSS zone 22 starts to hover. The voice coil motor is driven to move the actuator arm in the radial directions (Step S1) to conduct a calibration seek, to set the initial value specified by driving MPU 119, or to move the head slider toward the target track specified by drive MPU 119 at the speed specified by seek circuit 111 (Step S1).

Cleaning zone 23 will inevitably be traversed when moving the head toward a target track from CSS zone 22 or vice versa, due to the arrangement of the disk. Then, the rail surfaces come into contact with and slide across the surface of cleaning zone 23, and the rail surfaces are cleaned (Step S2).

Subsequently, the head slider leaves the cleaning zone and starts moving toward data zone 21 and the target track in the direction of the innermost part of the disk with the tracking control circuit turned ON, activating the tracking control with respect to the target tracks. In the reverse order, the head slider travels in the direction of the innermost part of the disk to be positioned at CSS zone 22, and parks on completion of the disk rotation (Step S3).

Accordingly, the rail surfaces are cleaned without any head movement control toward a particular cleaning zone. If the seek motion (radial traversing motion of head) is too fast for sufficient cleaning of the rail surfaces, driving MEU 119 reduces the speed of head motion when passing through the cleaning zone by means of the control, to ensure cleaning efficiency. Thus, this aspect of "speed control" of the head movement falls within the scope of this invention.

Figure 13:
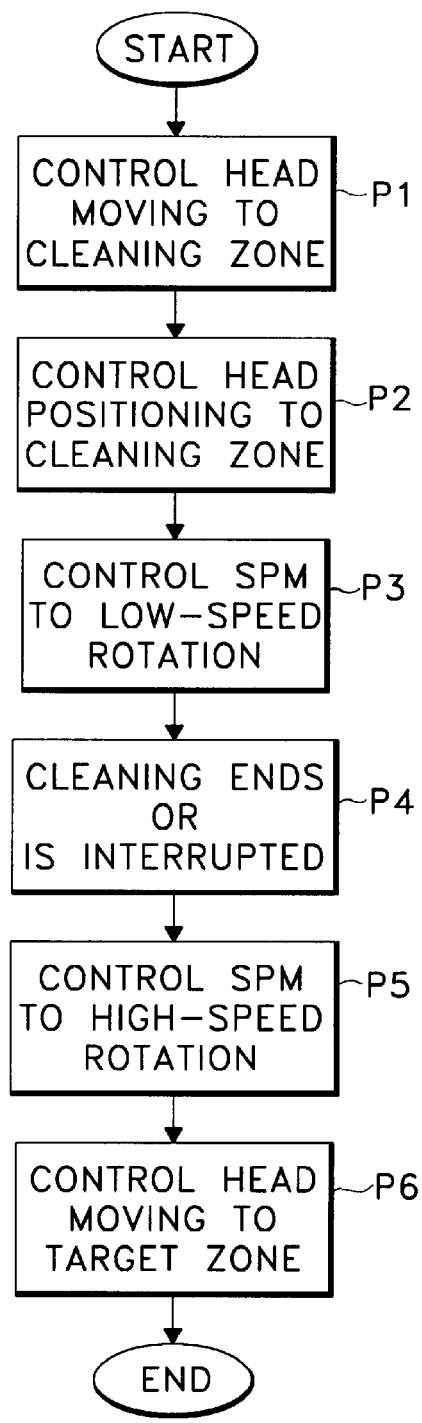
FIG. 13 is a flowchart showing another sequence for accessing a cleaning zone in the present invention.

FIG. 13 shows the access method for not only cleaning zone 23 in FIG. 7 to FIG. 10, but to cleaning zone 24 in FIG. 9 and FIG. 10, as well. To ensure the cleaning of the rail surfaces, the most efficient course of action would be to clean the rail surfaces at the optimal timing.

First, the head is seek-controlled toward the cleaning zone 23 or 24 (Step P1).

The head is tracking-controlled to align the rail surfaces with cleaning zone 23 or 24 facing such surfaces at the roughened zone surface (Step P2). Face-to-face alignment is confirmed based on the position signals recorded on the disk, or the actuator arm swivel position signals.

Then, the spindle motor is adjusted by rotational control to the lower speed (6000 RPM) specified by the drive MPU, and the disk speed is reduced (P3). Consequently, the floating height of the slider is lowered, resulting in a secure sliding contact between the rail surfaces and opposed cleaning zone 23 and/or 24.

The cleaning operation is complete after the preset clock timing or the regular disk RPM is detected. In the case of FIG. 9 and FIG. 10, there are two cleaning zones that are subject to the cleaning operations by invoking seek procedures and timing. In the case of interruption by an upper system, the cleaning process is suspended or terminated (Step P4).

Accordingly, this system can react promptly in response to the upper system. Also, in quick succession, the disk's regular disk speed is resumed after increasing the spindle motor speed to reach the high speed (about 7,200 RPM in steady condition) specified by the driving CPU (Step P5).

When the floating slider is elevated, the head exits the cleaning zone 23 or 24 and is controlled to move toward the target zone (track) (Step P6).

The head executes the recording or playing operation in response to the instruction from the upper system. The disk speed under which normal recording/playing is performed is 7,200 RPM.

In short, the cleaning of rail surfaces is effective and reliable and the slider maintains a stable floating performance.

In the above embodiments, although mechanisms for performing cleaning operations have taken examples from the system using a head having two or more pads, the same cleaning operation could be applied to a system using a head having only one pad.

Thus, the present invention provides a pad or pads installed on the surface areas of a base plate other than the rail surfaces, so that the accumulation of dust on the rail surfaces is minimized. Therefore, steady floating characteristics are preserved, resulting in the prevention of recording/playing problems and head failure casualties.

In accordance with the present invention, the steady floating characteristics are maintained over an extended period by adding a newly designed cleaning zone on the disk surface. Accordingly, this offers a reliable means of improving the durability and reliability of a disk system.

Furthermore, one or more pads can effectively prevent the rail and disk surface areas from sticking together, and two or more pads can reliably isolate rail surfaces from disk surfaces. Dust which accumulates near the pads does not adversely affect the floating characteristics of the rails. Therefore, the motor torque and/or energy can be reduced to promote miniaturization of the driving motor and reduced power consumption. Thus the disk system itself can be made more lightweight and compact.

While the principles of the invention have been described above in connection with specific apparatus and applications, it is to be understood that this description is made only by way of example and not as a limitation on the scope of the invention.

What is claimed is:

1. A disk drive comprising:
   at least one disk;
   means for rotating said at least one disk;
   a head slider configured and arranged to float upon a layer of air above a surface of said at least one disk when said at least one disk is rotating;
   said head slider including:
      a slider body having a base surface for facing the disk surface;
      first and second slider rails provided on the base surface of said slider body, said first and second slider rails having a first height from the base surface; and
      first and second pads provided on the base surface of said slider body, said first and second pads having a second height from the base surface which is greater than the first height, wherein said first and second pads are located in outer peripheral areas of the base surface, between one of said slider rails and an adjacent longitudinal edge of the base surface; and
   wherein all portions of said head slider are configured and arranged to float upon the layer of air above the rotating disk surface.

2. The disk drive as claimed in claim 1, wherein said head slider includes diamond-like carbon.

3. The disk drive as claimed in claim 1, wherein at least one of said pads is about 10 nm higher than at least one of said slider rails.

4. The disk drive as claimed in claim 1, wherein at least one of said pads is cylindrical.

5. The disk drive as claimed in claim 1, wherein at least one of said pads is elliptical.

6. A disk drive comprising:

at least one disk;

means for rotating said at least one disk;

a head slider configured and arranged to float upon a layer of air above a surface of said at least one disk when said at least one disk is rotating;

said head slider including:

a slider body having a base surface for facing the disk surface;

first and second slider rails provided on the base surface of said slider body, said first and second slider rails having a first height from the base surface; and first and second pads provided on the base surface of said slider body, said first and second pads having a second height from the base surface which is greater than the first height, wherein said first and second pads are sandwiched between said first slider rail and said second slider rail; and wherein all portions of said head slider are configured and arranged to float upon the layer of air above the rotating disk surface.

* * * * *